(12) United States Patent
Komatsu et al.

(10) Patent No.: US 9,044,986 B2
(45) Date of Patent: Jun. 2, 2015

(54) DIGITAL MOLD TEXTURIZING METHODS, MATERIALS, AND SUBSTRATES

(75) Inventors: Toshifumi Komatsu, Duluth, MN (US); Jeremy W. Peterson, Superior, WI (US); Alexander S. Gybin, Duluth, MN (US)

(73) Assignee: IKONICS CORPORATION, Duluth, MN (US)

( * ) Notice: Subject to any disclaimer, the term of this patent is extended or adjusted under 35 U.S.C. 154(b) by 0 days.

(21) Appl. No.: 13/328,485

(22) Filed: Dec. 16, 2011

(65) Prior Publication Data

US 2012/0237700 A1 Sep. 20, 2012

Related U.S. Application Data

(63) Continuation of application No. 11/625,164, filed on Jan. 19, 2007, now Pat. No. 8,097,176.

(60) Provisional application No. 60/760,208, filed on Jan. 19, 2006, provisional application No. 60/884,115, filed on Jan. 9, 2007.

(51) Int. Cl.
| | |
|---|---|
| B41M 5/00 | (2006.01) |
| B41M 5/50 | (2006.01) |
| B41J 3/407 | (2006.01) |
| B41M 5/025 | (2006.01) |
| C09D 11/101 | (2014.01) |
| B41M 5/52 | (2006.01) |
| B41M 7/00 | (2006.01) |
| B29C 33/42 | (2006.01) |

(52) U.S. Cl.
CPC ............ B41M 5/506 (2013.01); *B41M 5/52* (2013.01); *B41M 5/5218* (2013.01); *B41M 5/5254* (2013.01); B41J 3/407 (2013.01); B41M 5/0256 (2013.01); *B41M 7/0072* (2013.01); C09D 11/101 (2013.01); B41M 7/0081 (2013.01); *B29C 33/424* (2013.01)

(58) Field of Classification Search
CPC ...... B41M 5/506; B41M 5/52; B41M 5/5254; B41M 5/5218
USPC ................. 428/32.24, 32.25, 32.28, 32.34
See application file for complete search history.

(56) References Cited

U.S. PATENT DOCUMENTS

| | | | |
|---|---|---|---|
| 4,059,479 A | 11/1977 | Tanazawa | |
| 4,292,397 A | 9/1981 | Takeuchi et al. | |
| 4,321,105 A | 3/1982 | Melonio et al. | |
| 4,388,399 A | 6/1983 | Shinozaki et al. | |
| 4,596,759 A | 6/1986 | Schupp et al. | |
| 4,818,336 A | 4/1989 | Rossetti | |
| 5,334,485 A | 8/1994 | Van Iseghem et al. | |
| 5,348,616 A | 9/1994 | Hartman et al. | |
| 5,415,971 A | 5/1995 | Couture et al. | |
| 5,506,089 A | 4/1996 | Gybin et al. | |
| 5,518,857 A | 5/1996 | Suzuki et al. | |
| 5,645,975 A | 7/1997 | Gybin et al. | |
| 5,654,032 A | 8/1997 | Gybin et al. | |
| 5,756,243 A | 5/1998 | Matsuoka | |
| 6,020,436 A | 2/2000 | Gybin et al. | |
| 6,140,006 A | 10/2000 | Komatsu et al. | |
| 6,248,498 B1 | 6/2001 | Gybin | |
| 6,444,294 B1 | 9/2002 | Malhotra et al. | |
| 6,451,413 B1 | 9/2002 | Aurenty et al. | |
| 6,479,211 B1 | 11/2002 | Sato et al. | |
| 6,585,366 B2 | 7/2003 | Nagata et al. | |
| 6,605,406 B2 | 8/2003 | Johnson et al. | |
| 6,689,432 B2 | 2/2004 | Kitamura et al. | |
| 6,824,839 B1 | 11/2004 | Popat | |
| 6,824,957 B2 | 11/2004 | Okino et al. | |
| 6,824,960 B2 | 11/2004 | Lee et al. | |
| 6,830,803 B2 | 12/2004 | Vaidya | |
| 6,872,514 B2 | 3/2005 | Harada et al. | |
| 6,884,562 B1 | 4/2005 | Schadt, III et al. | |
| 6,927,014 B1 | 8/2005 | Figov | |
| 7,021,732 B2 | 4/2006 | Folkins | |
| 7,036,920 B2 | 5/2006 | Rousseau et al. | |

(Continued)

FOREIGN PATENT DOCUMENTS

| | | |
|---|---|---|
| EP | 0659039 | 6/1995 |
| EP | 1958778 | 8/2008 |

(Continued)

OTHER PUBLICATIONS

Caiger, Nigel et al., "Energy Curing in Ink Jet Digital Production Printing", The Reporter, IS&T, vol. 20, No. 4, Aug. 2005, (pp. 1-12), Pertinent pages: p. 5, "LED Curing," Aug. 2005.

European Office Action Received, from the European Patent Office in EP Patent Application No. 10174702.0, corresponding to U.S. Appl. No. 60/760,208, mailed Jun. 21, 2011, 3 pages.

Extended European Search Report, mailed Sep. 10, 2010 in corresponding European Patent Application No. 10174702.0, 7 pages.

International Search Report and Written Opinion, from International Application No. PCT/US2007/060793, mailed Sep. 28, 2007, 8 pages.

Non-Final Office Action, mailed Mar. 14, 2011 in co-pending U.S. Appl. No. 11/625,164, "Digital Mold Texturizing Methods, Materials, and Substrates," 19 pages.

(Continued)

*Primary Examiner* — Betelhem Shewareged (74) *Attorney, Agent, or Firm* — Pauly, Devries Smith & Deffner, LLC (57) ABSTRACT

Methods, materials, and systems for texturizing mold surfaces is disclosed. In one method and system of the invention, a first step involves generating a graphics file of a desired texture pattern. The graphics file is subsequently output to an ink jet printer, which is configured to print using an acid-etch resist ink. The acid-etch resist ink is formulated to provide optimal properties for ink jet printing, while also providing excellent acid-etch resist and superior handling properties. The acid-etch resist ink is printed onto a sheet of a carrier substrate that allows the acid-etch resist to be transferred to a mold surface, after which the mold surface is etched with a strong acid.

10 Claims, 5 Drawing Sheets

(56) References Cited

U.S. PATENT DOCUMENTS

| | | |
|---|---|---|
| 7,067,241 B2 | 6/2006 | Grabher et al. |
| 7,427,360 B2 | 9/2008 | Hopper et al. |
| 7,569,623 B2 | 8/2009 | Oyanagi et al. |
| 8,097,176 B2 | 1/2012 | Komatsu et al. |
| 2001/0000382 A1 | 4/2001 | Simons |
| 2001/0016249 A1 | 8/2001 | Kitamura et al. |
| 2002/0012773 A1 | 1/2002 | Vaidya et al. |
| 2004/0062896 A1 | 4/2004 | Picone et al. |
| 2004/0160466 A1 | 8/2004 | Annacone |
| 2005/0089650 A1 | 4/2005 | Tanaka et al. |
| 2006/0257662 A1 | 11/2006 | Bujard et al. |
| 2009/0233003 A1 | 9/2009 | Anderson et al. |

FOREIGN PATENT DOCUMENTS

| | | |
|---|---|---|
| JP | 60-244092 | 12/1985 |
| JP | 61-292632 | 12/1986 |
| JP | 03281790 | 12/1991 |
| JP | 04-202677 | 7/1992 |
| JP | 05-338187 | 12/1993 |
| JP | 09-202979 | 8/1997 |
| JP | 10-157085 | 6/1998 |
| JP | 11-198522 | 7/1999 |
| JP | 2000-151098 | 5/2000 |
| JP | 2005-060519 | 3/2005 |
| JP | 2006-108545 | 4/2006 |
| WO | 0143978 | 6/2001 |
| WO | 2004/026977 | 4/2004 |

OTHER PUBLICATIONS

Notice of Allowance, mailed Sep. 20, 2011 in co-pending U.S. Appl. No. 11/625,164, "Digital Mold Texturizing Methods, Materials, and Substrates" 8 pages.

Response to European Examination, Report dated Jun. 21, 2011, Filed in the European Patent Office on Dec. 23, 2011 for EP Patent Application No. 10174702.0, corresponding to U.S. Appl. No. 11/625,164, 18 pages.

DIGITAL MOLD TEXTURIZING METHODS, MATERIALS, AND SUBSTRATES

PRIORITY

This application is a continuation of U.S. application Ser. No. 11/625,164, filed Jan. 19, 2007, issued on Jan. 17, 2012 as U.S. Pat. No. 8,097,176, which claims the benefit of U.S. Provisional Application No. 60/760,208, filed Jan. 19, 2006 and U.S. Provisional Application No. 60/884,115, filed on Jan. 9, 2007, the contents of which are herein incorporated by reference.

FIELD OF THE INVENTION

The present invention is directed to a method and materials for texturizing molds. In particular, the invention is directed to a method of texturizing molds using ink jet printing of an acid-etch resist onto a transfer substrate, and then transferring the acid-etch resist to a mold surface to be texturized.

BACKGROUND

Currently, patterns for texturizing molds are typically prepared by methods that are either inefficient, produce inferior results, or are labor intensive. For example, current methods include a rice paper process that deposits a wax-based acid-etch resist onto rice paper. This rice paper method involves making acid-etched zinc plates as a primary means of generating texturing patterns. The wax is pressed into the zinc plates, transferred to the rice paper, and then applied to a mold surface using the rice paper. This method is expensive and time-consuming. A further problem is that the rice paper is not transparent, making placement of the patterns more difficult, particularly when registration with adjacent patterns is desired. In addition, the wax-based acid-etch resist can soften during application, causing a deterioration and distortion of the pattern, thereby producing a lower-quality mold.

An alternative method utilizes screen printing of a pattern onto carrier substrate, and then transferring the pattern to a mold substrate to be etched. This method is popular for some applications, but is relatively expensive, and the patterns often fail to meet specifications due to the fact that the graphics files are screen printed. It can be particularly difficult to create highly precise patterns using screen printed patterns. Also, using this method it is difficult to produce precisely registered images, which are needed to texturize molds with multiple depths of etch.

Therefore, a need exists for improved methods of making a textured pattern on mold surfaces.

SUMMARY OF THE INVENTION

The present invention is directed to methods, materials, and systems for texturizing mold surfaces. In one method and system of the invention, a first step involves generating a graphics file of a desired texture pattern. Typically such graphics files are generated on a computer. The graphics file is subsequently output to an ink jet printer, which is configured to print using an acid-etch resist ink. The acid-etch resist ink is formulated to provide optimal properties for ink jet printing, while also providing excellent acid-etch resist and superior handling properties. The acid-etch resist ink is printed onto a sheet of a carrier transfer substrate that allows the acid-etch resist to be transferred to a mold surface, after which the mold surface is etched with a strong acid.

Suitable acid-etch resists printed using the ink jet methodology include water based and solvent based compositions. Various phase-change materials, such as thermally or UV curable compositions, can be used. After printing and curing (by UV curing or solvent evaporation, for example) the resist should demonstrate adhesion to high carbon steel while being acid resistant to strong acids such as nitric acid and ferric chloride. The acid-etch resist should also typically withstand the operating temperatures associated with ink jet print heads.

The carrier transfer substrate onto which the acid-etch resist is deposited can contain one or more layers. For example, it can contain a removable carrier layer (such as polyester) with a release coating, or can contain a removable carrier layer with an additional binder layer and/or ink receptive layer. Thus, in some embodiments the carrier substrate contains an insoluble carrier layer and an ink receptive layer that is removable from this carrier layer. The ink receptive layer may be adhered to the insoluble carrier layer by the binder layer. In such embodiments, after the acid-etch resist is printed onto the ink receptive layer, the insoluble carrier layer and binder layer are peeled apart and the carrier layer discarded. The binder layer and ink receptive layer, which has an acid-etch resist pattern printed onto it, are then applied to a metal surface to be etched. Pressure is applied to the exposed surface of the binder layer so as to press the ink jet printed pattern of acid-etch resist onto the metal surface to be texturized. Thereafter the binder layer can be removed, such as by oxidizing, moistening, heating or further exposing to UV radiation. The acid-etch resistant pattern remains attached to the surface to be texturized after removal of the binder layer, and the texturization process can proceed by exposing the metal surface to an acid.

Advantages of methods of the invention over prior methods include that the methods of the invention are a digitized process that does not use screen printing, allows for accurate reproduction of images with precise registration, and permits an ease of pattern production without chemical etching of a zinc plate. Also, the methods can use customized patterns made on-site with no need to send pattern files to outside service providers, thereby promoting considerable ease, speed, and reliability of the process. Finally, the methods do not involve photolithography and can be done at very high quality.

The above summary of the present invention is not intended to describe each disclosed embodiment of the present invention. This is the purpose of the detailed description that follows.

FIGURES

The invention will be more fully explained with reference to the following drawings, in which.

While principles of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

The present invention is directed to methods, materials, and systems for texturizing mold surfaces. As described below, the materials include an ink jetable acid-etch resist that is printed onto a carrier substrate. The carrier substrate allows the acid-etch resist to be temporarily retained, but the resist is thereafter transferred to a metal mold surface that is to be etched.

Acid-Etch Resist

The acid-etch resist can include a liquid that is printed by ink jet using drop-on-demand (DOD) print heads. Suitable acid-etch resists printed using the ink jet methodology include those that are water or solvent based compositions. After printing and curing (such as by UV curing or solvent evaporation) the resist should demonstrate adhesion to high carbon steel while being acid resistant to strong acids such as nitric acid and ferric chloride. The acid-etch resist should also typically withstand the high operating temperatures associated with DOD print heads (up to 90° C.), and be transferable from the carrier substrate to the metal surface In certain embodiments, for example, the acid-etch resist can include water and acetates. The acid-etch resist can also include various solvent based dilutable pressure sensitive adhesives (PSAs). The printable acid-etch resist can include various solvents, including alcohols having more than four carbons, glycols, polyols, glycol ethers, glycol ether esters, ketones with five or more carbons (including cyclic ketones), hydrocarbons (alkanes, aromatics, cycloaliphatics), lactates (greater than butyl-), and esters (greater than butyl acetate).

As noted above, the acid-etch resist should be printable using an ink jet printer. The parameters of the printable acid-etch resist to determine ink jet-ability include, for some embodiments, having a viscosity of 8 to 20 cps at a temperature range of 20 to 90° C. It is important to select a viscosity that: allows the acid-etch resist to flow properly prior to ink jetting, allows the acid-etch resist to be adequately jetted out of the ink jet apparatus, and still allows the acid-etch resist to form a compact deposit onto the carrier substrate that does not readily flow laterally so as to blur the deposited pattern. The deposit also needs to be thick enough to transfer to a metal surface while retaining its acid resistance properties.

In some implementations the viscosity is greater than 20 cps, while in others the viscosity is below 8 cps at a temperature range of 20 to 90° C. Also, it is possible to demonstrate these viscosities at a more narrow range of temperatures. Specifically, in specific embodiments the acid-etch resist has a viscosity greater than 20 cps at a temperature of 90° C.

In specific embodiments the acid-etch resist has a viscosity greater than 50 cps at a temperature of 90° C., while in certain embodiments the acid-etch resist has a viscosity of greater than 70 cps at a temperature of 90° C. In specific embodiments the acid-etch resist has a viscosity greater than 20 cps at a temperature of 20° C., in specific embodiments the acid-etch resist has a viscosity greater than 50 cps at a temperature of 20° C., while in certain embodiments the acid-etch resist has a viscosity of greater than 70 cps at a temperature of 20° C. In specific embodiments the acid-etch resist has a viscosity greater than 20 cps at a temperature of 50° C., in specific embodiments the acid-etch resist has a viscosity greater than 50 cps at a temperature of 50° C., while in certain embodiments the acid-etch resist has a viscosity of greater than 70 cps at a temperature of 50° C.

In specific embodiments the acid-etch resist has a viscosity less than 100 cps at a temperature of 20° C., in specific embodiments the acid-etch resist has a viscosity less than 50 cps at a temperature of 20° C., while in certain embodiments the acid-etch resist has a viscosity of less than 70 cps at a temperature of 20° C. In specific embodiments the acid-etch resist has a viscosity less than 100 cps at a temperature of 50° C., in specific embodiments the acid-etch resist has a viscosity less than 50 cps at a temperature of 50° C., while in certain embodiments the acid-etch resist has a viscosity of less than 70 cps at a temperature of 50° C. It is important to select a viscosity that: allows the acid-etch resist to flow properly prior to ink jetting, allows the acid-etch resist to be adequately jetted out of the ink jet apparatus, and still allows the acid-etch resist to form a compact deposit onto the substrate that does not readily flow laterally so as to blur the deposited pattern. The deposit also needs to be thick enough to transfer to a metal surface while retaining its acid resistance properties.

It is also typically necessary to have the acid-etch resist demonstrate surface tension sufficient to retain the ink deposits substantially where they are placed on the substrate, while still allowing the distinct deposits to flow enough so as to slightly merge with neighboring dots. Such properties are dictated in part by viscosity, but also by surface tension. Generally the acid-etch resist composition can have a surface tension of 24 to 36 dynes/cm. In some embodiments the surface tension will be less than 24 or greater than 36 dynes/cm. Specific acid-etch resist compositions have surface tensions greater than 24 dynes/cm. Other specific acid-etch resist compositions have surface tensions less than 36 dynes/cm.

Particle size of the deposited acid-etch resist will often be less than 2 μm, frequently less than 1 μm. It will be understood, however, that in some embodiments the particle size will be greater than 2 μm. The vapor pressure of example printable acid-etch resists is often below 50 torr, typically below 30 torr, and optionally below 20 torr.

As noted above, the acid-etch is UV curable in some implementations. The UV source can include mercury vapor lamps, light emitting diodes, and other UV sources. Generally it is desirable to have a UV source that permits rapid cure of the acid-etch resist, as necessary. Also, as discussed more fully below, a two-step curing process offers significant benefits. In such two-step curing processes the resist is initially cured at a low UV dosage to prevent undesirable flow of the resist, followed by a second high UV dosage to more fully cure the resist. In some implementations it is also desirable to do a final cure of the acid-etch resist after the resist has been transferred to the metal surface. Such cure steps can be more complete, because it is not necessary to subsequently transfer the resist again, and thus the resist does not need to remain tacky.

In some implementations the acid-etch resist comprises a UV curable material comprising a hydrocarbon resin combined with reactive diluent, often reactive monomer diluents. The reactive monomer diluents often contain acrylate reactive groups. Suitable hydrocarbon resins can be selected so as to offer tackifying properties to the acid-etch resist. The resins can have, for example, a $T_g$ of 60 to 100° C. in some embodiments, while glass transition temperatures below 60° C. or greater than 100° C. are suitable in some embodiments. The reactive diluents, often monomers, frequently have a molecular weight above 100, generally above 150. Molecular weights below 1000 are often desirable, and even more typically below 500. Suitable monomers include many reactive monomers with molecular weights from 100 to 500. It will be appreciated that not all monomer within the composition must be reactive or contain a reactive group, but that sufficient reactive sites must be present within the resin and monomer composition to provide adequate UV curing to create a transferable acid-etch resist.

An example acid-etch resist suitable for use with the present invention contains Norsolene S-135 hydrocarbon tackifier (available from Sartomer Company Inc. of Exton, Pa.), monofunctional monomer diluents such as SR-504 and SR-256 available as well from Sartomer, and a UV curing initiator, such as Irgacure 819. Further ingredients can include small amounts of MEHQ (UV inhibitor), Irganox 1076 (a monofunctional hindered phenolic antioxidant) and Orasol Blue GL (a dye). SR-256 is the trade name for 2(2-ethoxyethoxy)-ethyl acrylate, which is water dispersible, monofunctional monomer having a molecular weight of 188, a $T_g$ of −54° C., and a viscosity of 6 cps @ 25° C. SR-504 is the trade name for ethoxylated nonyl-phenol acrylate, which is a low odor, low volatility monomer for use in UV and E-beam polymerization, having a molecular weight of 450, surface tension of 33.5 dynes/cm, and a viscosity of 100 cps @ 25° C. Norsolene S-135 is a light colored, low odor aromatic resin that is solid at room temperature, and has a softening point of 133° C., $T_g$ of 81.7° C.

In one example embodiment, the acid-etch resist contains approximately 23 parts by weight Norsolene S-135; approximately 36.5 parts by weight SR-504; and approximately 34 parts be weight SR-256; plus approximately 2.8 parts by weight Irgacure 819, 0.09 parts by weight MEHQ, 0.14 parts by weight Irganoz 1076, and 2.83 parts by weight Orasol Blue GL.

Carrier Substrate

Carrier substrates used in accordance with the present invention can be of varying compositions and constructions. In general, the carrier substrate must accept the acid-etch resist and retain it sufficiently for handling and positioning onto a mold without distortion, but must then release the acid-etch resist onto the metal mold surface after positioning (and optional treatment, such as with a solvent to separate the resist from the carrier substrate). Preferably, the carrier substrate is flexible, thin, transparent or substantially transparent, minimally stretchable, and stable under various levels of ambient humidity.

As discussed above, the carrier substrate (onto which the acid-etch resist is deposited) can include a thin top layer along with a thicker carrier layer. The thin top layer is preferably about 5 to 15 microns thick for ease of bending around curves on a mold surface. In some implementations the top layer that receives the acid-etch resist will be too thin to support itself or to support the acid-etch resist without distortion. In such implementations it is particularly desirable to have a two-layer substrate: a top layer that receives the acid-etch resist plus a carrier layer to hold this top layer.

In some embodiments one or more layers of the acid-etch resist will have an adhesive bond to the carrier substrate that is readily released under specific conditions, such as moistening the carrier substrate with water or another solvent. In other embodiments the acid-etch resist will have a stronger bond to the carrier substrate, but will cohesively break when the carrier substrate is removed such that a portion of the acid-etch resist remains on the carrier substrate, but the majority of the acid-etch resist is retained on the surface of the mold. Generally it is desirable to have the bond between the mold surface and the acid-etch resist be significantly stronger than the bond between the acid-etch resist and the carrier substrate. Also, the acid-etch resist desirably has a relatively high cohesive strength, so that an adhesive break occurs between the acid-etch resist and the carrier substrate, as opposed to a cohesive break.

The carrier substrate can include polyester; polypropylene; and carbohydrate polymers, including cellulose, modified cellulose, cellophane, carboxymethylcellulose, hydroxypropyl cellulose, starch and dextrins, pectin, and alginates. These carbohydrate polymers can be coated as a thin water soluble or insoluble film onto a carrier film. Specifically, the substrate may be, for example, a polyester containing a coated hydrolyzed polyvinyl alcohol. Another specific suitable carrier substrate for some applications includes, for example, 3-4 mil polyester coated with fully hydrolyzed polyvinyl alcohol of generally less than 50 microns, often from 3 to 20 microns, and preferably from about 5 to 10 microns thick.

In certain embodiments the carrier substrate is penetrable and/or soluble in water or other solvents, so as to facilitate removal of the carrier substrate from the mold. Typically the water or solvent will have a materially lower impact on the acid-etch resist, so as to avoid also dissolving or excessively softening the acid-etch resist when the carrier substrate is softened or removed.

In certain embodiments the substrate comprises a multi-layer ink-receptive substrate, the ink-receptive substrate comprising a micro-porous ink receptive layer; a degradable binder layer; and a carrier layer. The degradable binder layer is positioned intermediate the micro-porous ink receptive layer and the insoluble carrier layer. In some embodiments the micro-porous ink receptive layer comprises alumina particles or other water-insoluble particles, such as silica particles. Generally the alumina particles are held in place by polyvinyl alcohol or other organic matrix.

In certain implementations a fluorescing dye is added to the substrate to permit inspection of the substrate to confirm proper transfer of an acid resist to surface to be etched. For example, the fluorescing dye may be incorporated into the ink receptive layer, the binder layer, or both. By incorporating the fluorescing dye into these layers, it is possible to visually inspect the surface to be etched to confirm that there has been a proper printing and transfer of acid resist.

The use of the fluorescing dye is particularly useful in the ink receptive layer for confirmation that there has been proper transfer of the acid resist and that the acid resist is properly developed to remove areas that have not been printed upon (thereby allowing acid etching). Generally in such implementations the areas that have not received acid resist are washed away during processing of the film (after application to the surface to be etched), simultaneously carrying away the fluorescing dye in those areas. After processing some dye typically remains in the portion of the substrate that has received the acid resist, allowing easy visual inspection to confirm acid resist position and integrity, as well as to confirm that processing has removed excess portions of the substrate.

In certain implementations the micro-porous ink receptive layer comprises at least 10 percent by dry weight porous alumina or silica, while in other implementations the micro-porous ink receptive layer comprises at least 50 percent by dry weight porous alumina or silica; and in other implementations the micro-porous ink receptive layer comprises at least 80 percent by dry weight porous alumina. In still other implementations the micro-porous ink receptive layer comprises at least 70 percent by dry weight porous alumina.

When polyvinyl alcohol is used in the micro-porous ink-receptive layer, the ink receptive layer typically comprises at least 10 percent by dry weight polyvinyl alcohol, and in certain embodiments the micro-porous ink receptive layer comprises at least 20 percent by dry weight polyvinyl alcohol, and optionally at least 30 percent by dry weight polyvinyl alcohol. In some implementations the ink receptive layer comprises at least 50 percent polyvinyl alcohol, at least 70 percent polyvinyl alcohol, or even more than 90 percent polyvinyl alcohol. In an example formulation the micro-porous ink receptive layer comprises from 60 to 80 percent by dry weight porous alumina and from 20 to 40 percent by dry weight polyvinyl alcohol.

The degradable binder layer can include, for example polyvinyl acetate and/or polyvinyl alcohol. In one such implementation the degradable binder layer comprises at least 10 percent by dry weight polyvinyl acetate and at least 50 percent by dry weight polyvinyl alcohol; optionally at least from 15 to 35 percent by dry weight polyvinyl acetate and from 65 to 85 percent by dry weight polyvinyl alcohol. This degradable binder layer is generally peelably removable from the carrier layer after printing. After removal of the carrier layer, the binder layer, ink receptive layer and acid etch resist are applied to a mold surface (with the acid etch resist and ink receptive layer in contact with the mold surface and the binder layer exposed). Suitable career layers include, for example polyester. The carrier layer is at generally at least 1 mil thick.

One example substrate comprises a multi-layer ink receptive substrate, the ink-receptive substrate comprising an ink receptive layer comprising at least 50 percent by weight of porous alumina; a degradable binder layer comprising at least 25 percent by weight polyvinyl alcohol; and a substantially water-insoluble carrier layer; wherein the degradable binder layer is positioned intermediate the micro-porous ink receptive layer and the insoluble carrier layer.

Figure 1:
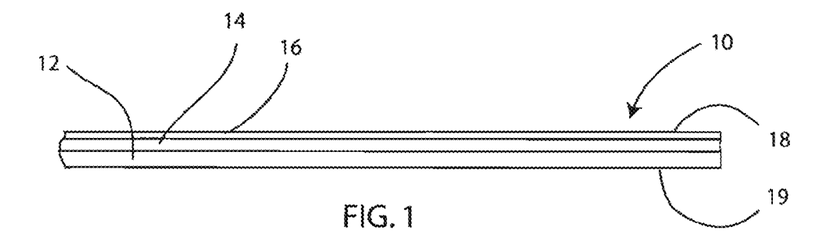
FIG. 1 shows a cross section of a carrier substrate suitable for use with the invention, prior to deposition of an acid-etch resist.
Figure 2:
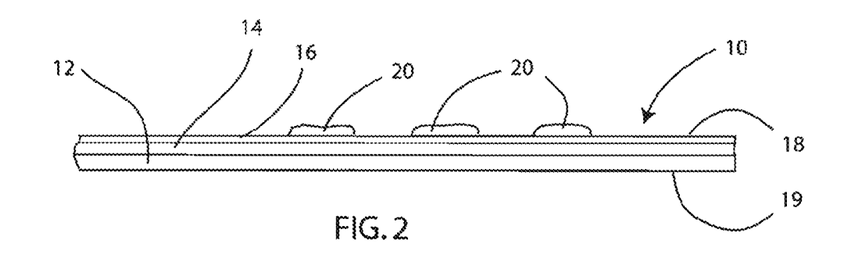
FIG. 2 shows a cross section of a carrier substrate after deposition of an acid-etch resist.

Configuration of a suitable carrier substrate 10 is shown in FIG. 1, which indicates an enlarged cross section of insoluble carrier layer 12 (such as a polyester layer), plus a degradable binder layer 14, and a microporous ink-receptive layer 16. The carrier substrate contains a top surface 18 and a bottom surface 19. The top surface 18 receives acid-etch resist from an inkjet printer, while the bottom surface 19 allows for ready handling of the substrate 10. FIG. 2 shows a subsequent step of the process of the invention, in which an acid-etch resist 20 has been deposited onto the top surface 18 of the carrier substrate 10, specifically onto microporous ink-receptive layer 16. The acid-etch resist 20 is shown having somewhat distinct topical relief. In actual use this relief, as well as the space between deposits of acid-etch resist 20 can be readily adjusted by the rate of cure of the resist, as well as the viscosity and surface tension of the acid-etch resist composition 20.

After sufficient curing of the acid-etch resist 20 (if a curable composition is used), the carrier substrate 10 can be applied to metal surface. In some implementations the insoluble carrier layer 12 is removed before the acid-etch resist 20 is applied to the surface of the metal 22 to be etched, while in other implementations the insoluble carrier layer 12 is removed after the acid-etch resist 20 is applied to the metal surface. However, it can be quite desirable to remove the insoluble carrier layer 12 before the acid-etch resist 20 is applied to the metal surface because the remaining portion of the carrier substrate 10 is generally far more flexible than the insoluble carrier layer 12. Thus, removal of the insoluble carrier layer 12 allows the remaining degradable binder layer 14 and ink-receptive layer 16 onto which the acid-etch resist 20 has been printed to be flexed to conform to a metal surface that will be etched, such as a concave or convex mold surface.

Figure 3:
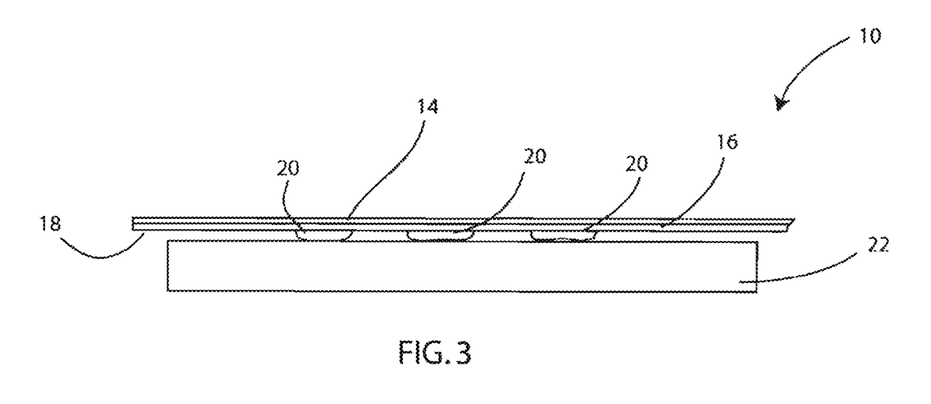
FIG. 3 shows a cross section of a carrier substrate after deposition of an acid-etch resist and after application to a metal surface.

FIG. 3 shows an acid-etch resist 20 after it has been applied to a metal object 20. In this embodiment insoluble carrier layer 12 has been removed. A next step is typically to remove the binder layer 14, as well as any exposed ink-receptive layers 16. The binder layer 14 can be removed using an oxidizer, such as sodium metaperiodate, especially when the binder contains polyvinyl acetate and/or polyvinyl alcohol. The removal of the binder layer 14 is often necessary so as to expose underlying portions of the metal 22.

Figure 4:
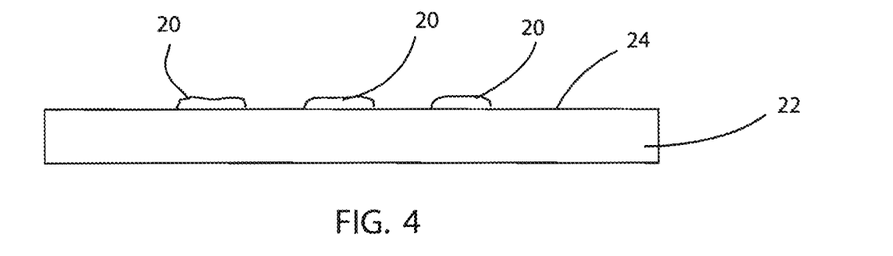
FIG. 4 shows a cross section of the acid-etch resist after application to a metal surface and after removal of the carrier substrate, but before acid etching.
Figure 5:
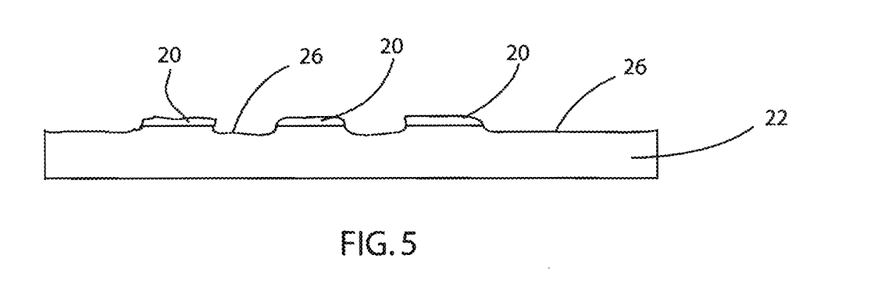
FIG. 5 shows the metal surface after etching but before removal of the remaining acid-etch resist.
Figure 6:
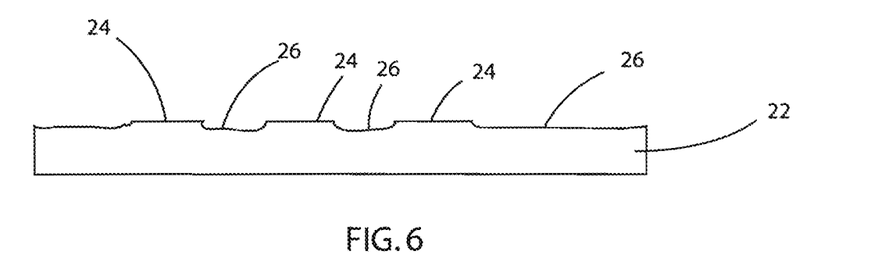
FIG. 6 shows the metal surface after etching and after removal of the remaining acid-etch resist.

FIG. 4 shows the next step of the process, in which the acid-etch resist 20 remains, but the binder layer 14 and most of the ink-receptive layer 16 has been removed. In actual use portions of the ink-receptive layer 16 might remain in contact with the acid-etch resist 20, especially when the ink-receptive layer 16 contains particles (alumina, silica, etc.) to which the acid-etch resist has bonded. It will be appreciated that these residual portions of the ink-receptive layer 16 do not pose any significant negative issue with regard to acid etching the top surface 24 of metal 22, because they are retained in locations where acid-etch resist is intended to prevent etching of the metal 22. In fact, in certain embodiments the presence of small amounts of remaining ink-receptive layer 16 can provide the reducing tackiness of the exposed acid-etch resist while also providing a small additional acid resistance. FIG. 5 shows the metal 22 after etching, including etched portions 26, along with retained acid-etch resist 20. Thereafter remaining acid-etch resist is removed, as shown in FIG. 6.

Ink Jet Printer

The ink jet printers used to print the acid-etch resist can use various ink jet printing processes, including drop on demand thermal or piezoelectric systems. Optionally, the ink jet printer can use continuous printing. In thermal printing, a print cartridge with a series of tiny electrically-heated chambers is used. The printer runs a pulse of current through the heating elements. A steam explosion in the chamber forms a bubble, which propels a droplet of ink onto the paper. The ink's surface tension pumps another charge of ink into the chamber through a narrow channel attached to an ink reservoir. Typically thermal printing techniques use ink that is water-based.

In the alternative, the ink jet printer may use a piezoelectric ink jet that has one or more piezoelectric crystals in each nozzle instead of a heating element. When current is applied, the crystal bends, forcing a droplet of ink from the nozzle. Piezoelectric ink jet technology allows a wider variety of inks than thermal or continuous ink jet printing.

Finally, a continuous ink jet method can be used. In continuous ink jet technology, a high-pressure pump directs liquid ink from a reservoir through a microscopic nozzle, creating a continuous stream of ink droplets. A piezoelectric crystal causes the stream of liquid to break into droplets at regular intervals. The ink droplets are subjected to an electrostatic field created by a charging electrode as they form. The field is varied according to the degree of drop deflection desired. This results in a controlled, variable electrostatic charge on each droplet. Charged droplets are separated by one or more uncharged "guard droplets" to minimize electrostatic repulsion between neighboring droplets. The charged droplets are then directed (deflected) to the receptor material to be printed by electrostatic deflection plates, or are allowed to continue undeflected to a collection gutter for reuse. The more highly charged droplets are deflected to a greater degree. One of the advantages of continuous ink jet printing is freedom from nozzle clogging as the jet is always in use.

Methods

In one method of the invention, a first step involves generating a graphics file of a desired texture pattern. Typically such graphics files are generated on a computer. This file is then output to an ink jet printer, which is configured to print using an acid-etch resist ink. The carrier transfer substrate onto which the acid-etch resist is deposited can contain one or more layers. For example, it can contain a removable carrier layer (such as polyester) with a release coating, or can contain a removable carrier layer with an additional binder layer and/or ink receptive layer. Thus, in some embodiments the carrier substrate contains an insoluble carrier layer and an ink receptive layer that is removable from this carrier layer. The ink receptive layer may be adhered to the insoluble carrier layer by the binder layer. In such embodiments, after the acid-etch resist is printed onto the ink receptive layer, the insoluble carrier layer and binder layer are peeled apart and the carrier layer discarded. The binder layer and ink receptive layer, which has an acid-etch resist pattern printed onto it, are then applied to a metal surface to be etched. Pressure is applied to the exposed surface of the binder layer so as to press the ink jet printed pattern of acid-etch resist onto the metal surface to be texturized. Thereafter the binder layer can be removed, such as by oxidizing, moistening, heating or further exposing to UV radiation. The acid-etch resistant pattern remains attached to the surface to be texturized after removal of the binder layer, and the texturization process can proceed by exposing the metal surface to an acid.

It is often desirable, to perform a two-step curing of the acid-etch resist. This can be desirably accomplished, for example, by a low-power partial initial cure, followed by a higher power second cure. The low-power partial cure is designed to thicken the ink such that it does not readily smear or significantly flow, yet can spread slightly between dots to create a more solid pattern. Thus the initial cure allows for very low flow levels adequate for dots of ink jetted acid-etch resist to fuse together slightly along their edges, but not so significantly that the pattern is disrupted by excessive flow.

Figure 7:
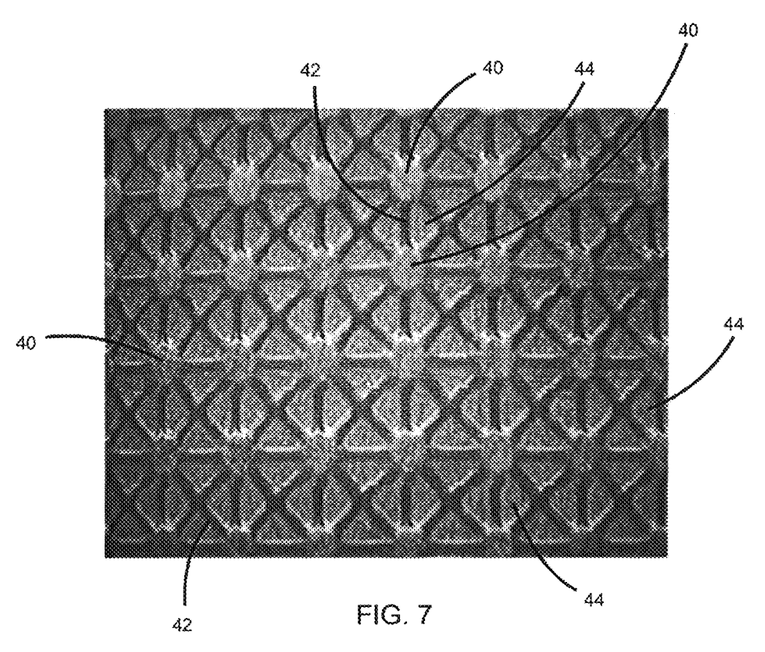
FIG. 7 shows a photograph of an acid-etch resist deposited onto a carrier substrate, the acid-etch resist having undergone initial cure to anchor the resist to the substrate.

Referring now to FIG. 7, an enlarged photo of a pattern of acid-etch resist deposited onto a carrier substrate is shown. In FIG. 7 an extremely detailed pattern of acid-etch resist has been created, having substantially circular spots 40 of acid etch resist connected by thin lines 42 of acid etch resist, all separated by small triangles of exposed substrate 44 (said exposed substrate 44 corresponding to portions of the ink-receptive layer onto which no acid-etch resist has been deposited). The centers of each of the spots 40 is approximately 25 microns apart in the example shown in FIG. 7. Thus, the ability to create acid-etch resist features of just a few microns in size is possible using the present invention.

Figure 8:
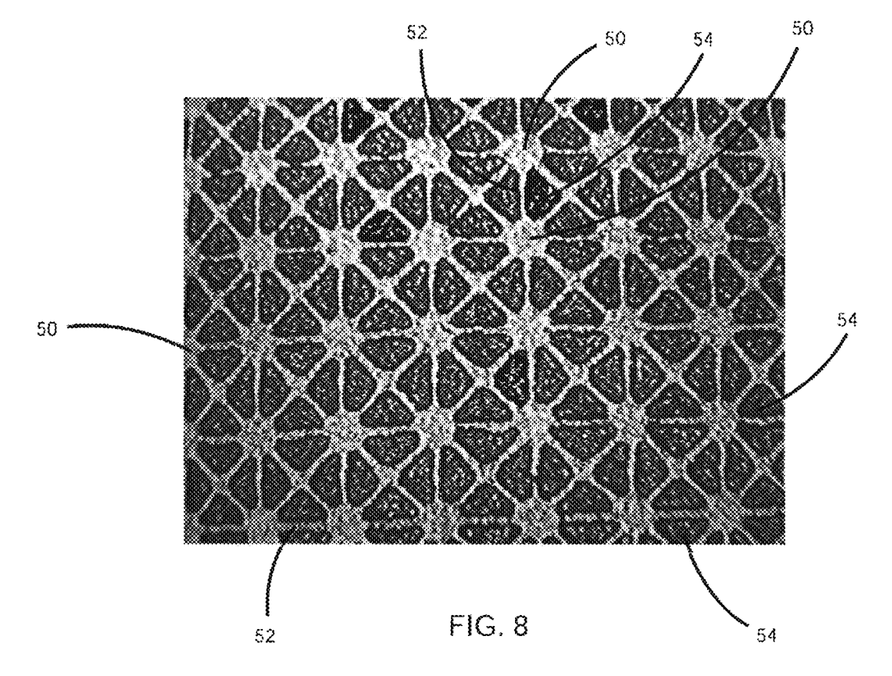
FIG. 8 shows a photograph of a metal surface etched using the acid-etch resist of FIG. 7.

FIG. 8 shows a metal surface etched using an acid-etch resist pattern similar to that shown in FIG. 7. The etched surface of FIG. 8 shows substantially circular non-etched areas 50 joined by non-etched lines 52 connect them (corresponding to the spots 40 and lines 42 of acid-etch resist of FIG. 7). The surrounding triangles of etched metal 54 correspond to the areas of exposed substrate 44 of FIG. 7.

Figure 9:
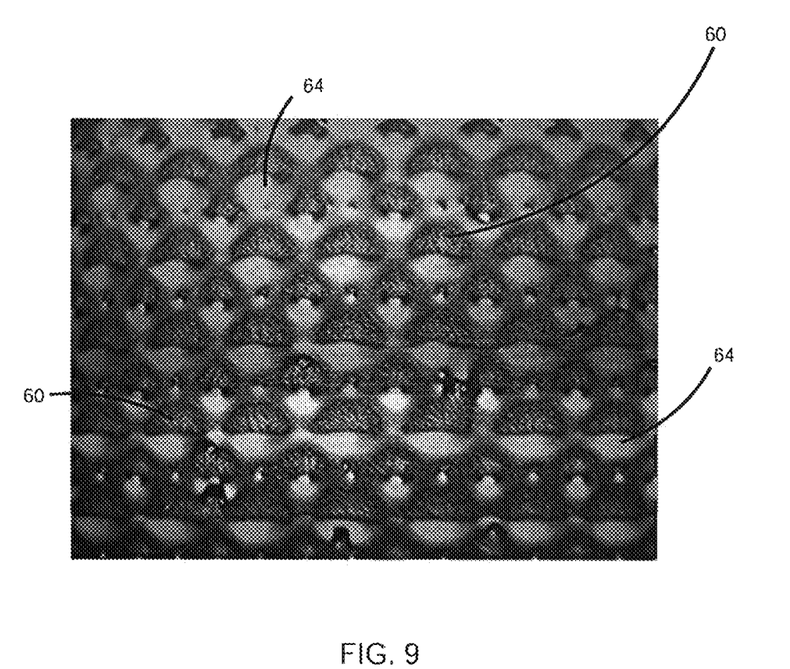
FIG. 9 shows a photograph of an acid-etch resist deposited onto a carrier substrate, the acid-etch resist having not undergone initial cure to anchor the resist to the substrate.

The remarkable detail shown in FIGS. 7 and 8 is made possible, in part, by conducting a very rapid partial cure of the acid-etch resist immediately after deposit onto the substrate. Printing tests show that the acid-etch resist spreads slightly on the carrier substrate after it is printed, which can distort the image. This can be overcome by "pinning" the acid-etch resist in place after each printing pass using a UV source. If a strong UV source is used, each pass of ink retains a domed shape after it has been fully cured. The result is printing lines being visible on the surface of the printed image onto the metal mold after it has been etched. Therefore, it is typically preferable to use a relatively weak UV source for pinning the ink, such as an LED mounted adjacent to the print head of the printing unit. The initial cure is likely to have a UV dose of less than 50 mJ/cm$^2$, more likely less than 25 mJ/cm$^2$, even more typically less than 5 mJ/cm$^2$ or less than 1 mJ/cm$^2$ in some applications. FIG. 9 shows a acid-etch resist applied to a carrier substrate but not "pinned" using an initial cure step. Although the printed pattern should have appeared much like that of FIG. 7, it has deteriorated remarkably such that the acid-etch resist portions 60 are substantially blurred with areas of exposed substrate 64.

Similarly, the final cure is desirably from a much more intense UV light source, often in an inert atmosphere. Suitable final curing often involves doses of more than 100 mJ/cm$^2$, more than 200 mJ/cm$^2$, and optionally more than 300 mJ/cm$^2$. The energy dose can be raised to allow for better repositioning or lowered to allow for higher tack and adhesion to the metal surface to be etched. The doses should be high enough to prevent spreading of the acid-etch resist over time before application to the mold.

The use of multiple pattern transfers will require that the transfers be aligned and joined together. The transfer is then burnished onto the surface, and with the use of a releasing agent, the tissue carrier is removed. Match lines and fitted contours can be blended by hand using a liquid acid resistant material. After an inspection, the mold is ready to move on to the etching area. A mold may either be submersed in an acid bath or hung vertically and sprayed with acid. The type of metal alloy will determine the proper acid formula to be used. The desired depth is governed by the temperature of the mold and acid combined with the amount of time the mold is exposed to the acid.

Examples

Various example formulations were evaluated to determine suitability for the present invention. The requirement for adhesion to steel was evaluated by placing the cured acid-etch resist sample on a piece of highly polished P20 high carbon steel and testing release of the acid-etch resist from the steel.

The first set of samples evaluated were established ink jet inks proven to work in DOD print heads. These samples included solvent based and UV curable inks from Sunjet (SOV, UPA), and Lavalnk (Ecosolvent 640). As a group, none of the samples tested had significant adhesion to the steel after curing. These results can be viewed as typical because ink jet inks for conventional printing are formulated to be tack-free after cure for handling and storage purposes.

The second set of samples evaluated were liquids known to be acid-resistant. The samples included Blue 212 from Nazdar, CM-34449 for Cudner & O'Conner, Sue-600B from Seoul Chemical, and NTC-W70 from Coates Chemical. None of the samples evaluated adhered to the steel sample after curing.

Solvent-based pressure sensitive adhesives (PSAs) were also evaluated. The samples included PS6776M1 from Clifton Adhesives, PS149 from Valpac, and 280A from Dow Corning. These PSA samples had good adhesion to metal, but had to be diluted to fall within the desired viscosity range for DOD printing (8 to 20 cps). When diluted to the proper viscosity, the samples had a solid content of 5 to 8%. This solid content is relatively low for most applications of the invention, and is likely to make resist buildup difficult and could require multiple ink jet head passes over the substrate. Also, the solvent used for dilution (toluene) has a low surface tension that made ejection of droplets from a DOD print head very difficult.

The next set of samples tested was based on a UV curable pressure-sensitive adhesive formulation. The formulations consisted of a hydrocarbon tackifier (S-135), and two low viscosity, monofunctional monomer diluents (SR-256, SR-504), all available from Sartomer. The monomer content was increased to reduce the viscosity (110 cps at 25° C.) and 3% of the initiator Irgacure 819 (a photo initiator for radical polymerization of unsaturated resins upon UV light exposure) was added to the fluid. The ink jettability of the fluid was tested using a SM-128 print head from Spectra at a temperature of 70° C. The fluid was observed to have good jetting properties. The fluid was then coated on a sheet of 2 mil PET using a wire-wound rod at a thickness of 0.6 mils, and cured using a 5 kW metal halide exposure unit for 100 units at a distance of 23 inches. The cured film was pressed to the polished steel sample and demonstrated high adhesion. The high temperature stability of the fluid was also evaluated by placing a sample of the fluid, with initiator, at 180° F. for one week. No gelling or increase in viscosity was observed in the fluid.

This initial formulation is shown below, but had a viscosity of 290 cps at 25° C., too high for ink jetting even at elevated temperatures.

| Tackifier | S-135 | 32.95 |
| Monomer | SR-256 | 31.43 |
| Monomer | SR-504 | 33.52 |
| Stabilizer | MEHQ | 0.04 |
| Antioxidant | 1076 | 0.1 |
| Photoinitiator | TZT | 1.96 |
| Total: | | 100 |

A modified formulation was produced as follows:

| Tackifier | S-135 | 24.27 |
| Monomer | SR-504 | 37.65 |
| Monomer | SR-256 | 35.17 |
| Photoinitiator | 819 | 2.91 |
| | | 100.00 |

In a first example, in order to test this modified formulation, a carrier substrate was prepared by coating a fully hydrolyzed PVA 90-50/water solution (10%) in a layer 2 mils thick on sheet of polyester and dried at 70° C. for 15 minutes. The resulting PVA layer was 7 microns thick.

In a next step, the test formulation was printed onto the PVA layer using a Spectra SE128 print head with an Apollo II Print head controller. The head voltage was 75 volt, the pulse width was 8 msec and the rise and fall was 2 msec. The head temperature was set at 70° C. Ink jet printing was done manually onto a piece of the carrier substrate. Thereafter, the formulation was exposed to UV using a 1 KW medium pressure Hg-bulb at a distance of 15 cm, with an exposure of 100 units.

Cured acid resist on the PVA sub layer of the carrier substrate was pressed upon P-20 highly polished steel surface and the polyester backing was removed. Water was sprayed over the PVA layer and left in place for 3 minutes, after which the PVA had wrinkled and was removed leaving acid resist on the metal surface. Transferred acid resist was examined under a microscope and found to be minimally smeared over the metal: most of the pattern features were as they were seen on PVA layer before transfer.

In a second example, the same technique was used as described above, but instead of PVA/polyester construction for the carrier substrate, a single-layer carrier was used of 0.5 mils thick cellophane. After curing of acid resist and pressing upon P-20 steel article, water was sprayed over and let to work for 3 minutes. Removal of cellophane sheet left acid-resist on the metal.

In a third example, acid resist fluid described in the first example was coated on polyester using wire-rod #6. UV-curing was done exposing the fluid under nitrogen with a 5 KW medium pressure Hg-bulb at a distance of 36 inches. Sufficient curing of acid resist in these conditions was achieved with a dose of 100 mJ/cm$^2$.

We claim:
1. A multi-layer ink receptive film for applying an ink material to a surface of a substrate, the ink-receptive film comprising:
   a micro-porous ink receptive layer configured to be adhered to a surface of the substrate;
   a degradable binder layer which can be readily removed from the substrate to which the film has been applied, the degradable binder layer removable by oxidizing, moistening, heating or further exposure to radiation; and
   an insoluble carrier layer configured so as to be peelably removable from the degradable binder layer while leaving substantially all of the degradable binder layer retained on the substrate to which the film has been applied;
   wherein the degradable binder layer is positioned intermediate the micro-porous ink receptive layer and the insoluble carrier layer, and wherein the micro-porous ink receptive layer is configured to be at least partially removed from the surface of the substrate along with the degradable binder layer by oxidizing, moistening, heating, or further exposure to radiation so as to at least partially expose the substrate to which the multi-layer ink receptive film has been applied.

2. The multi-layer ink receptive film of claim 1, wherein the micro-porous ink receptive layer comprises alumina or silica particles.

3. The multi-layer ink receptive film of claim 1, wherein the micro-porous ink receptive layer comprises substantially water-insoluble particles.

4. The multi-layer ink receptive film of claim 3, wherein the substantially water-insoluble particles comprise alumina or silica particles.

5. The multi-layer ink receptive film of claim 1, wherein the micro-porous ink receptive layer includes alumina particles.

6. The multi-layer ink receptive film of claim 1, wherein the micro-porous ink receptive layer comprises polyvinyl alcohol and porous alumina particles.

7. The multi-layer ink receptive film of claim 1, wherein the micro-porous ink receptive layer comprises at least 10 percent by dry weight porous alumina.

8. The multi-layer ink receptive film of claim 1, wherein the micro-porous ink receptive layer comprises at least 30 percent by dry weight porous alumina.

9. The multi-layer ink receptive film of claim 1, wherein the micro-porous ink receptive layer comprises at least 60 percent by dry weight porous alumina.

10. The multi-layer ink receptive film of claim 1, wherein the micro-porous ink receptive layer comprises at least 80 percent by dry weight porous alumina.

\* \* \* \* \*